United States Patent
Meguro

(10) Patent No.: US 9,250,577 B2
(45) Date of Patent: Feb. 2, 2016

(54) TRANSFER UNIT INCLUDING A BELT UNIT WITH A MOVING ASSEMBLY, AND IMAGE FORMING APPARATUS THEREOF

(75) Inventor: Yuuji Meguro, Ohta-ku (JP)

(73) Assignee: Ricoh Company Ltd., Tokyo (JP)

( * ) Notice: Subject to any disclaimer, the term of this patent is extended or adjusted under 35 U.S.C. 154(b) by 204 days.

(21) Appl. No.: 13/137,667

(22) Filed: Sep. 1, 2011

(65) Prior Publication Data

US 2012/0057908 A1    Mar. 8, 2012

(30) Foreign Application Priority Data

Sep. 7, 2010  (JP) .................... 2010-199827

(51) Int. Cl.
*G03G 15/16* (2006.01)
*F16H 7/08* (2006.01)
*G03G 15/01* (2006.01)

(52) U.S. Cl.
CPC .......... *G03G 15/1675* (2013.01); *F16H 7/0827* (2013.01); *G03G 15/0136* (2013.01); *G03G 2215/0132* (2013.01); *G03G 2215/0193* (2013.01)

(58) Field of Classification Search
CPC ....................................... G03G 15/14
USPC ......................... 399/299, 302, 308
See application file for complete search history.

(56) References Cited

U.S. PATENT DOCUMENTS

| | | | |
|---|---|---|---|
| 6,192,207 B1 * | 2/2001 | Yamamoto et al. | 399/82 |
| 7,054,585 B2 * | 5/2006 | Sasamoto et al. | 399/299 |
| 7,599,633 B2 | 10/2009 | Inoue et al. | |
| 7,616,923 B2 | 11/2009 | Hatayama et al. | |
| 7,751,762 B2 | 7/2010 | Hatayama et al. | |
| 7,778,568 B2 | 8/2010 | Sakashita et al. | |
| 7,869,750 B2 | 1/2011 | Hanashima et al. | |
| 7,869,751 B2 | 1/2011 | Adachi et al. | |
| 7,904,010 B2 | 3/2011 | Meguro et al. | |

(Continued)

FOREIGN PATENT DOCUMENTS

| | | |
|---|---|---|
| JP | 2001337497 A | 12/2001 |
| JP | 2002-365928 | 12/2002 |

(Continued)

OTHER PUBLICATIONS

Abstract of Japanese Patent Publication No. JP2003-186313, published on Jul. 4, 2003.

(Continued)

*Primary Examiner* — Quana M Grainger
(74) *Attorney, Agent, or Firm* — Harness, Dickey & Pierce, P.L.C.

(57) ABSTRACT

A belt unit includes a belt wound around a plurality of rollers to rotate endlessly, a contact member disposed along a surface of the belt, an opposing member disposed facing the contact member via the belt, a moving member including an action receiving portion, to swing and movably support the opposing member to contact and separate from the belt, and a moving assembly. The moving assembly includes an actuator to bias the action receiving portion in a first direction in which the opposing member contacts the belt and in a second direction opposite the first direction in which the opposing member separates from the belt, a drive mechanism to move the actuator in the first and the second directions, and an elastic member to transmit a moving force of the actuator to the action receiving portion when the actuator moves.

23 Claims, 7 Drawing Sheets

(56) References Cited

U.S. PATENT DOCUMENTS

| | | |
|---|---|---|
| 7,970,297 B2 | 6/2011 | Inoue et al. |
| 7,970,336 B2 | 6/2011 | Sakashita et al. |
| 2006/0245782 A1* | 11/2006 | Hirai et al. .................. 399/101 |
| 2007/0110458 A1 | 5/2007 | Inoue et al. |
| 2007/0183816 A1 | 8/2007 | Hatayama et al. |
| 2007/0196126 A1 | 8/2007 | Tanaka et al. |
| 2007/0269233 A1 | 11/2007 | Sakashita et al. |
| 2008/0028967 A1 | 2/2008 | Sakashita et al. |
| 2008/0050158 A1 | 2/2008 | Hatayama et al. |
| 2008/0138133 A1 | 6/2008 | Hatayama et al. |
| 2008/0187365 A1 | 8/2008 | Sakashita et al. |
| 2008/0193167 A1 | 8/2008 | Inoue et al. |
| 2008/0193173 A1 | 8/2008 | Meguro et al. |
| 2008/0226358 A1 | 9/2008 | Hanashima et al. |
| 2008/0310893 A1 | 12/2008 | Adachi et al. |
| 2008/0317521 A1 | 12/2008 | Inoue et al. |
| 2009/0011882 A1 | 1/2009 | Kichise et al. |
| 2009/0129831 A1 | 5/2009 | Sakashita et al. |
| 2010/0284708 A1 | 11/2010 | Sugitani et al. |
| 2011/0188891 A1* | 8/2011 | Ryu et al. ...................... 399/121 |

FOREIGN PATENT DOCUMENTS

| | | |
|---|---|---|
| JP | 3526798 | 2/2004 |
| JP | 3968238 | 6/2007 |

OTHER PUBLICATIONS

Abstract of Japanese Patent Publication No. JP2001-166602, published on Jun. 22, 2011.

U.S. Office Action for U.S. Appl. No. 14/107,588 dated Mar. 6, 2015.

Japanese Office Action dated Dec. 17, 2013, for corresponding Japanese Patent Application No. 2010-199827.

* cited by examiner

AT POINT A

AT POINT B

AT POINT C

AT POINT D

AT POINT A

AT POINT B

AT POINT C

AT POINT D

TRANSFER UNIT INCLUDING A BELT UNIT WITH A MOVING ASSEMBLY, AND IMAGE FORMING APPARATUS THEREOF

CROSS-REFERENCE TO RELATED APPLICATIONS

This patent application is based on and claims priority pursuant to 35 U.S.C. §119 to Japanese Patent Application No. 2010-199827, filed on Sep. 7, 2010, in the Japan Patent Office, the entire disclosure of which is hereby incorporated herein by reference.

BACKGROUND OF THE INVENTION

1. Field of the Invention

Exemplary aspects of the present invention generally relate to an image forming apparatus, such as a copier, a facsimile machine, a printer, or a multi-functional system including a combination thereof, and more particularly, to a belt unit including a belt that contacts or separates from an object and an image forming apparatus including the belt unit.

2. Description of the Related Art

Related-art image forming apparatuses, such as copiers, facsimile machines, printers, or multifunction printers having at least one of copying, printing, scanning, and facsimile functions, typically form an image on a transfer sheet such as a recording medium according to image data. Thus, for example, a charger uniformly charges a surface of an image bearing member; an optical writer projects a light beam onto the charged surface of the image bearing member to form an electrostatic latent image on the image bearing member according to the image data; a developing device supplies toner to the electrostatic latent image formed on the image bearing member to render the electrostatic latent image visible as a toner image; the toner image is directly transferred from the image bearing member onto a transfer sheet or is indirectly transferred from the image bearing member onto a transfer sheet via an intermediate transfer member; a cleaning device then cleans the surface of the image carrier after the toner image is transferred from the image carrier onto the transfer sheet; finally, a fixing device applies heat and pressure to the transfer sheet bearing the unfixed toner image to fix the unfixed toner image on the transfer sheet, thus forming the image on the transfer sheet.

In image forming apparatuses that employ a belt as an intermediate transfer member (hereinafter referred to as an intermediate transfer belt), when transferring a toner image formed on a photoconductive drum onto the intermediate transfer belt, the intermediate transfer belt needs to contact the photoconductive drum. However, if the intermediate transfer belt remains in continuous contact with the photoconductive drum, charge remaining on the intermediate transfer belt degrades the photoconductive layer of the photoconductive drum, producing an uneven electric potential on the photoconductive drum that results in uneven images.

In a case of forming a monochrome image with a color image forming apparatus, only a photoconductive drum for the color black is used to form the monochrome image while other photoconductive drums remain idle. However, in order to prevent the intermediate transfer belt from getting damaged by friction with the photoconductive drums, it is necessary to drive the photoconductive drums for the color image even when these photoconductive drums are not actually used to form the image. As a result, the lifespan of the photoconductive drums is shortened. A similar problem arises with a conveyance belt that transports a recording medium onto which a toner image is directly transferred from the photoconductive drums.

To address such a difficulty, there are known image forming apparatuses that employ a belt unit including an eccentric cam to enable the belt to contact and separate from the photoconductive drums.

However, such belt units are relatively large and expensive, thus hindering efforts to provide the low-cost, compact image forming apparatuses for which there is market demand.

BRIEF SUMMARY OF THE INVENTION

In view of the foregoing, in one illustrative embodiment of the present invention, a belt unit includes an endless rotatable belt, a contact member, an opposing member, a moving member, and a moving assembly. The endless rotatable belt is wound around a plurality of rollers and formed into a loop. The contact member is disposed along a surface of the belt. The opposing member is disposed facing the contact member via the belt. The moving member swings and movably supports the opposing member to contact and separate from the belt. The moving member includes an action receiving portion. The moving assembly biases the action receiving portion of the moving member in a first direction in which the opposing member contacts the belt and in a second direction opposite the first direction in which the opposing member separates from the belt. The moving assembly includes an actuator, a drive mechanism, and an elastic member. The actuator biases the action receiving portion of the moving member in the first and the second directions. The drive mechanism moves the actuator in the first and the second directions. The elastic member transmits a moving force of the actuator to the action receiving portion when the actuator moves.

In another illustrative embodiment of the present invention, an image forming apparatus includes the belt unit.

Additional features and advantages of the present invention will be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein.

DETAILED DESCRIPTION OF THE INVENTION

Figure 1:
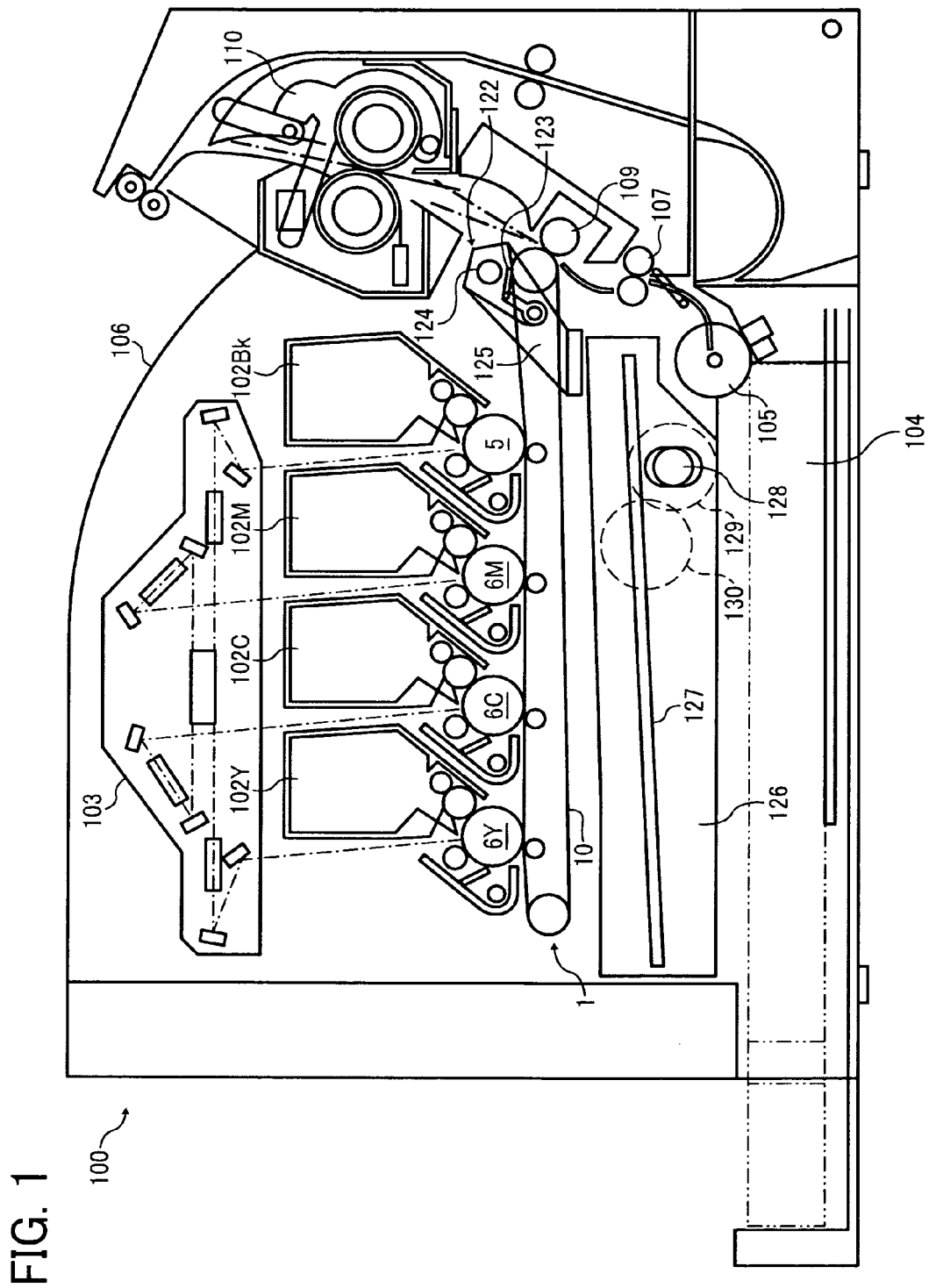
FIG. 1 is a schematic cross-sectional diagram illustrating an image forming apparatus according to an illustrative embodiment of the present invention.

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Figure 7:
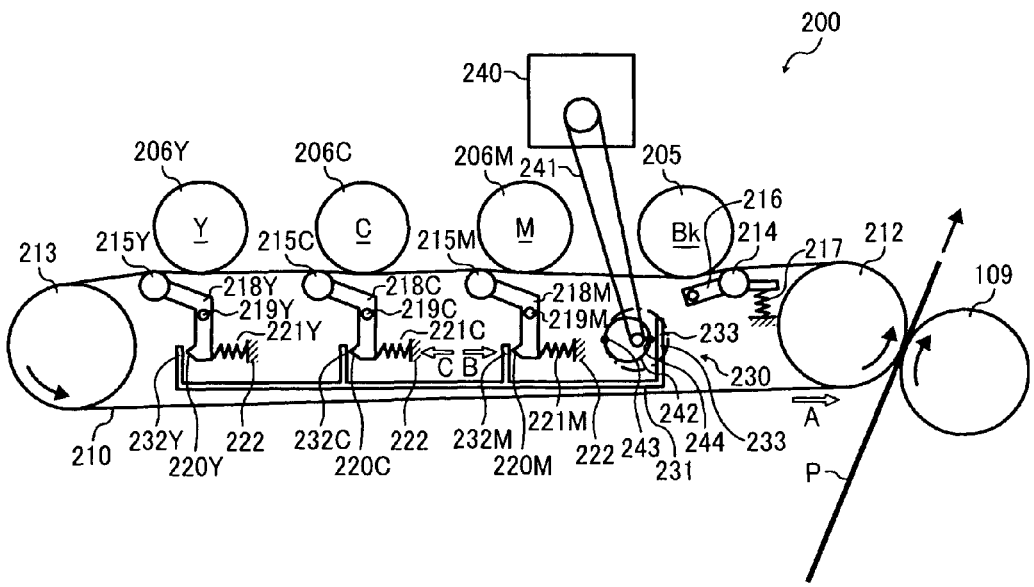
FIG. 7 is a schematic cross-sectional diagram illustrating a related-art belt unit in an image forming apparatus.

In order to facilitate an understanding of the related art and of the novel features of the present invention, a description is provide of a related-art belt unit employed in an image forming apparatus. FIG. 7 is a cross-sectional view of the related art belt unit.

An intermediate transfer belt unit 200 includes an intermediate transfer belt 210 formed into a loop, and four photoconductive drums 205B, 206M, 206C, and 206Y An intermediate transfer belt unit 200 is a tandem-type image forming apparatus in which four photoconductive drums 205, 206M, 206C, and 206Y, one for each of the colors black, magenta, cyan, and yellow are arranged in tandem. Primary transfer rollers 214, 215M, 215C, and 215Y are disposed inside the loop formed by the intermediate transfer belt 210 opposite the photoconductive drums 205, 206M, 206C, and 206Y via the intermediate transfer belt 210. The primary transfer roller 214 is swingably supported by an arm 216 and biased against the intermediate transfer belt 210 by a pressing spring 217. The primary transfer rollers 215M, 215C, and 215Y are swingably supported by arms 218M, 218C, and 218Y, and biased by pressing springs 221M, 221C, and 221Y against the intermediate transfer belt 210. A moving assembly 230 moves the primary transfer rollers 215 away from the intermediate transfer belt 210.

It is to be noted that the suffixes M, C, Y, and K denote colors magenta, cyan, and black, respectively. To simplify the description, the suffixes M, C, Y, and K indicating colors are omitted herein, unless otherwise specified.

The arms 218 are swingable about support shafts 219, thereby contacting or separating from the intermediate transfer belt 210. One end of each of the pressing springs 221 contacts the rear end of the arms 218 (also referred to as arm hook portions 220) while the other end of the pressing springs 221 is supported by a spring bearing surface 222 fixed to a frame, not illustrated, of the intermediate transfer belt unit 200.

The moving assembly 230 includes an eccentric cam 242, a slider 231, and a driving device 240 that drives the slider 231. The slider 231 moves to bias the arm hook portions 220 so that the primary transfer rollers 215 can contact and separate from the intermediate transfer belt 210. The slider 231 includes slider hook portions 232Y, 232C, and 232M and a cam bearing surface 233. The slider hook portions 232 directly contact the arm hook portions 220. The cam bearing surface 233 contacts a cam surface of the eccentric cam 242. The center of rotation of the eccentric cam 242 is connected to the driving device 240 via a transmitter 241 such as a gear and a pulley.

The eccentric cam 242 is rotated by the driving device 240, enabling the slider 231 to move and contact the arm hook portions 220. Accordingly, the arms 218 rotate about the support shafts 219, and the primary transfer rollers 215 start to separate from the intermediate transfer belt 210. The pressing springs 221 are compressed as the slider 231 moves, generating load torque in a direction hindering the rotation of the eccentric cam 242. When the primary transfer rollers 215 are separated completely, an amount of compression is at maximum.

Figure 8:
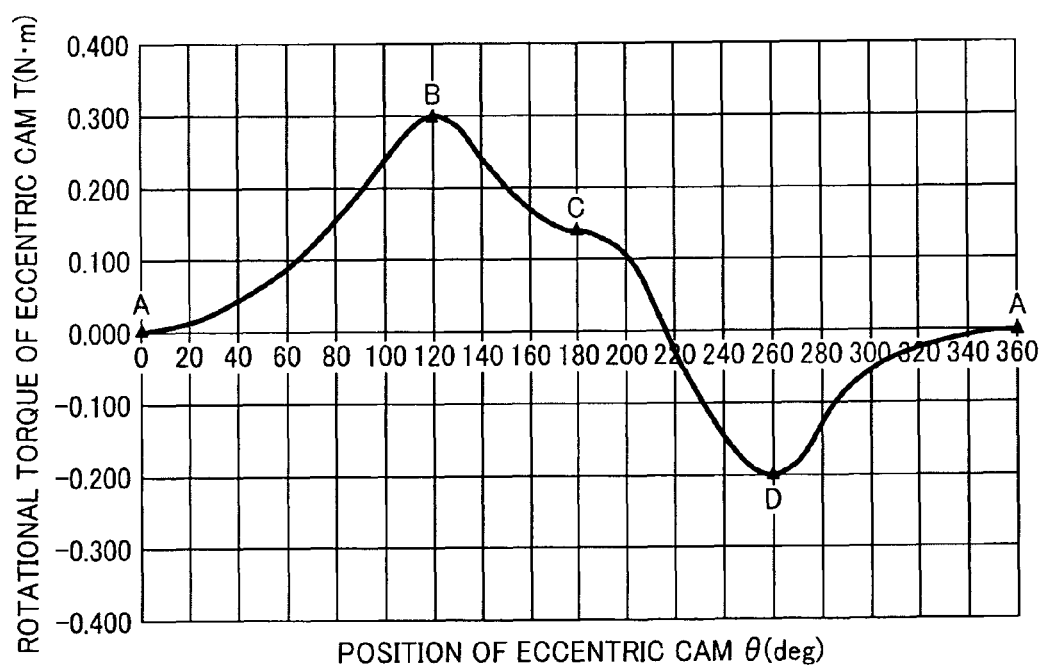
FIG. 8 is a torque curve showing rotational torque of a cam shaft of an eccentric cam employed in the belt unit of FIG. 7 as primary transfer rollers contact and separate from an intermediate transfer belt.
Figure 9A:
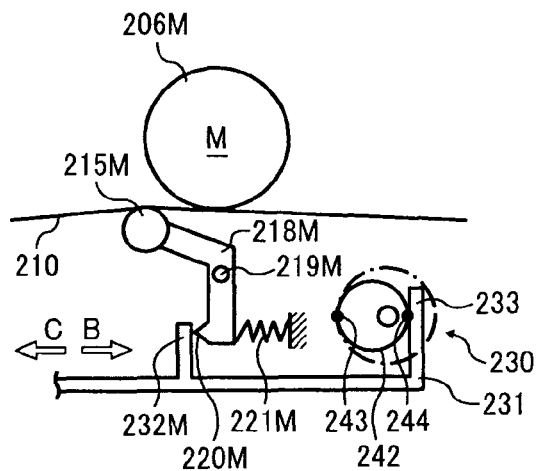
FIGS. 9A through 9D are partially enlarged schematic diagrams illustrating a relation between an amount of rotation of the eccentric cam and positions of devices in the belt unit of FIG. 7 in relation to point A through point D shown in FIG. 8.
Figure 9B:
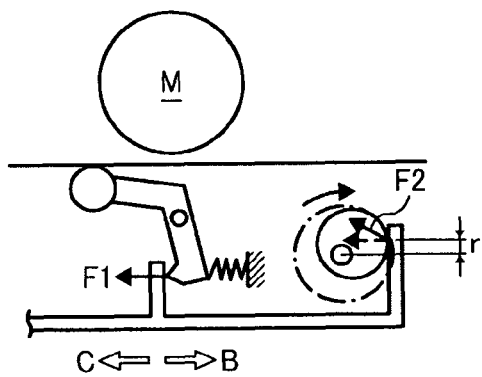
Figure 9C:
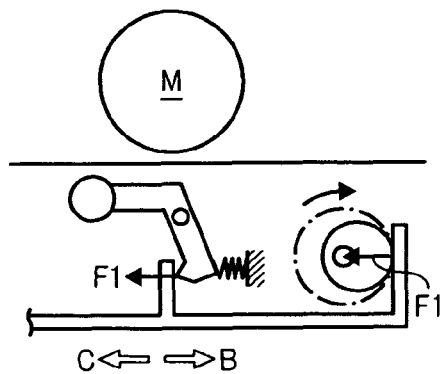
Figure 9D:
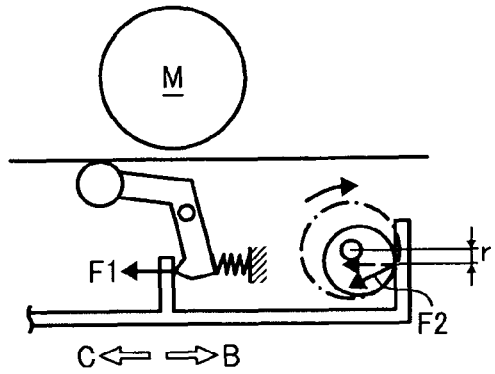

With reference to FIGS. 8 and 9A-9D, a description is provided of a relation between an amount of rotation of the eccentric cam and the position of devices in the belt unit. FIG. 8 is a torque curve showing a rotational torque of a cam shaft of the eccentric cam 242 when the primary transfer rollers 215 contact and separate from the intermediate transfer belt 210.

FIGS. 9A through 9D are schematic diagrams illustrating positions of the devices associated with the amount of rotation of the eccentric cam 242 shown in FIG. 8. It is to be noted that in FIGS. 9B through 9D, the suffix M indicating the color is omitted.

In FIG. 8, at point A, a bottom dead center 244 of the eccentric cam 242 and the cam bearing surface 233 are closest to each other. In FIG. 8, at point C, a top dead center 243 of the eccentric cam 242 and the cam bearing surface 233 contact each other. From point A to point B, the primary transfer rollers 215 move in the direction separating from the intermediate transfer belt 210, but the primary transfer rollers 215 are still in contact with the intermediate transfer belt 210. From point B to point D, the primary transfer rollers 215 are separated from the intermediate transfer belt 210. From point B to point C, the primary transfer rollers 215 move in the direction separating from the intermediate transfer belt 210. From point C to point D, the primary transfer rollers 215 move towards the intermediate transfer belt 210. From point D to point A, the primary transfer rollers 215 move towards the intermediate transfer belt 210 and contact the intermediate transfer belt 210.

During color printing, the primary transfer rollers 215 are always pressed against the photoconductive drums 206. Hence, separating the primary transfer rollers 215 from the intermediate transfer belt 210 requires force greater than the pressing force. From point A to point B, a force F that the eccentric cam 242 receives from the slider 231 is F=F2×r. Therefore, the shaft torque in the direction opposite the direction of rotation of the eccentric cam 242 is generated and continues to rise gradually. The shaft torque is at maximum near point B, thus requiring relatively large drive torque, thereby complicating efforts to make the driving device 240 as compact as is usually desired. From point B to point C, the torque decreases gradually, and change in the torque becomes gradual near point C.

By contrast, from point C to point D, the slider 231 is pressed by the pressing spring 221 in the direction indicated by an arrow C corresponding to a direction of contact. In addition to the rotational torque (drive force) of the driving device 240, the force F (=F2×r) which accelerates rotation acts on the eccentric cam 242. As a result, engagement of the gear and the pulley becomes unstable due to backlash of the transmitter 241, hence generating undesirable noise such as shock sound when the gear or the pulley collides. After the acceleration of the eccentric cam 242 reaches the maximum (near point D), as the slider 231 and the eccentric cam 242 collide and as the primary transfer roller 215 and intermediate transfer belt 210 collide, undesirable shock sound is generated.

From point D to point A, the pressing force from the slider 231 decreases gradually. Near point A, because the eccentric cam 242 receives only rotational load from friction, engagement of the gear and the pulley of the transmitter 241 becomes stable. In particular, in offset transfer such as shown in FIG. 7, an amount of movement of the primary transfer rollers 215 separating from the intermediate transfer belt 210 is large, and hence the amount of compression of the pressing spring 221 is large. This means that the force acting on the slider 231 is also large. As a result, the shaft torque in the direction opposite the direction of rotation of the eccentric cam 242 is large, necessitating large drive torque and hereby complicating efforts to make the driving device 240 compact.

Referring now to the drawings, wherein like reference numerals designate identical or corresponding parts throughout the several views, and initially to FIG. 1, one example of an image forming apparatus according to an illustrative embodiment of the present invention is described.

FIG. 1 is a schematic cross-sectional diagram illustrating the image forming apparatus according to the illustrative embodiment of the present invention. An image forming apparatus 100 is a tandem-type color image forming apparatus including process cartridges 102Y, 102C, 102M, and 102BK arranged in tandem and removably installable relative to the image forming apparatus 100. It is to be noted that the suffixes Y, C, M, and Bk denote colors yellow, cyan, magenta, and black, respectively. These suffixes indicating the colors are omitted unless otherwise specified. The image forming apparatus 100 includes an exposure device 103, an intermediate transfer unit 1 (hereinafter referred to as an intermediate transfer belt unit), a sheet cassette 104, a fixing device 110, and so forth.

Each of the process cartridges 102 includes a photoconductive drum (photoconductive drums 5, and 6Y, 6C, and 6M) serving as an image bearing member and as a contact member. Substantially above the process cartridges 102, the exposure device 103 is disposed to illuminate the photoconductive drums 5, and 6Y, 6C, and 6M with light. The exposure device 103 includes a light source such as a light-emitting diode (LED) and a laser diode (LD) to project light against the surfaces of the photoconductive drums 5 and 6 based on a read image read by a reading unit, not illustrated, and an image signal sent from an external device such as a personal computer and the like, thereby forming a latent image on the surfaces of the photoconductive drums 5 and 6.

The sheet cassette 104 that stores multiple transfer sheets P (recording media sheets) onto which a toner image is transferred is disposed substantially at the bottom of the image forming apparatus 100. The image forming apparatus 100 includes a sheet feed roller 105, a pair of registration rollers 107, a secondary transfer roller 109, the fixing device 110, and a sheet discharge tray 106. The sheet feed roller 105 picks up a top sheet from a stack of transfer sheets P and sends it to the downstream side in the direction of conveyance of the transfer sheet P. The secondary transfer roller 109 transfers the toner image onto the transfer sheet P. The fixing device 110 fixes the toner image on the transfer sheet P. After the toner image is fixed on the transfer sheet P, the transfer sheet P is discharged onto the sheet discharge tray 106.

The image forming apparatus 100 shown in FIG. 1 employs an intermediate transfer method and includes the intermediate transfer belt unit 1 serving as a belt unit. The intermediate transfer belt unit 1 includes an intermediate transfer belt 10 serving as an intermediate transfer member. The intermediate transfer belt 10 is formed into a loop and rotates endlessly. The toner images formed on the photoconductive drums 5 and 6 are primarily transferred onto the intermediate transfer belt 10 and carried to the secondary transfer roller 109 where the toner images are transferred onto a recording medium.

After the secondary transfer process, a belt cleaning device 122 removes residual toner that has not been transferred during the secondary transfer process and thus remains on the intermediate transfer belt 10. The residual toner removed from the intermediate transfer belt 10 is recovered to a waste toner bin 126. The belt cleaning device 122 includes a cleaning blade 123 and a conveyance screw 124. The cleaning blade 123 contacts the intermediate transfer belt 10 to remove the residual toner therefrom. The conveyance screw 124 transports the removed toner to the waste toner bin 126.

The process cartridges 120 installed in the image forming apparatus 100 forms toner images. The toner images are transferred primarily onto the intermediate transfer belt 10 so that they are superimposed one atop the other, thereby forming a composite toner image. Subsequently, the transfer sheet P in the sheet cassette 104 is picked up and sent to the pair of registration rollers 107 by the sheet feed roller 105. The pair of registration rollers 107 stops the transfer sheet P temporarily and sends it to the secondary transfer roller 109 in appropriate timing such that the transfer sheet P is aligned with the composite toner image formed on the intermediate transfer belt 10. Accordingly, the composite toner image is transferred onto the transfer sheet P. Subsequently, the transfer sheet P bearing the composite toner image passes between rollers of the fixing device 110 so that the composite toner image is fixed onto the transfer sheet P by heat and pressure. Subsequently, the transfer sheet P is discharged onto a sheet discharge tray 106.

The residual toner remaining on the intermediate transfer belt 10, not having been transferred onto the transfer sheet P after the secondary transfer, is removed by the cleaning blade 123, and transported as waste toner to one end of the belt cleaning device 122 by the conveyance screw 124. The waste toner passes through a joint portion 125 connected to the waste toner bin 126 and is collected in the waste toner bin 126. While the waste toner is collected in the waste toner bin 126, a mixing plate 127 is vibrated to mix the waste toner in the waste toner bin 126 so that the waste toner bin 126 is filled with the waste toner thoroughly. The mixing plate 127 contacts a shaft 128 penetrating from inside the waste toner bin 126 to outside. A gear 129 provided to an end portion of the shaft 128 engages a gear 130 of the image forming apparatus 100 to receive force generated by the vibration.

Figure 2:
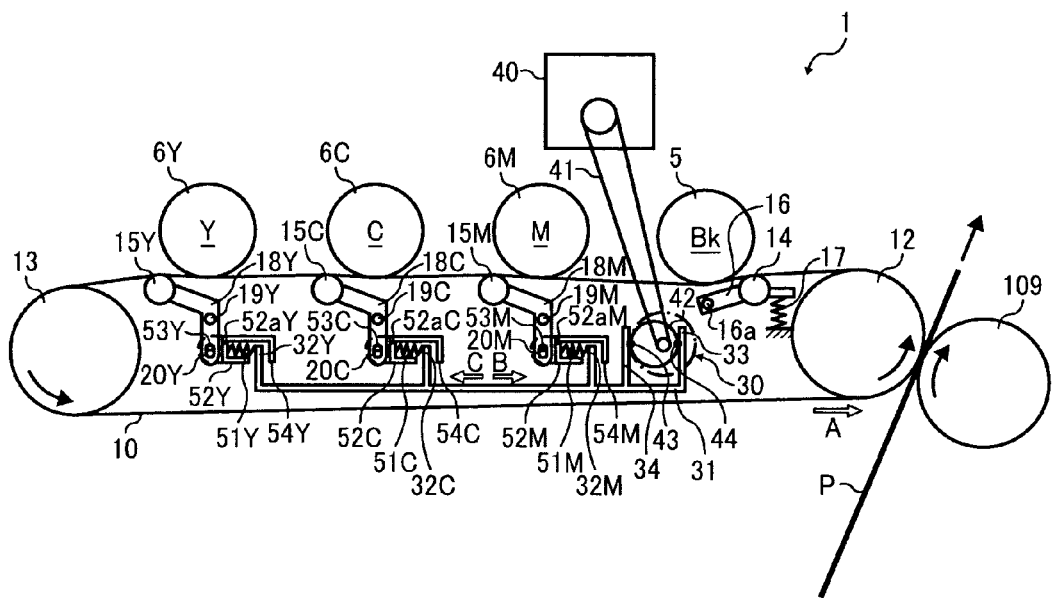
FIG. 2 is a schematic cross-sectional diagram illustrating an intermediate transfer belt unit employed in the image forming apparatus of FIG. 1, in a state in which an intermediate transfer belt contacts photoconductive drums and primary transfer rollers.

With reference to FIG. 2, a description is provided of the intermediate transfer belt unit 1 employed in the image forming apparatus 100 according to the illustrative embodiment of the present invention. FIG. 2 is a schematic cross-sectional diagram illustrating the intermediate transfer belt unit 1 in a state in which the intermediate transfer belt 10 contacts the photoconductive drums 5 and 6M, 6C, and 6K, and primary transfer rollers 14 and 15M, 15C, and 15Y. It is to be noted that the suffixes Y, C, M, and Bk indicating colors are omitted unless otherwise specified.

The intermediate transfer belt unit 1 (a belt unit) includes the intermediate transfer belt 10 (a belt member) formed into a loop and wound around and stretched between a drive roller 12 and a driven roller 13 (stretch members). The photoconductive drums 5 and 6 serving as an image bearing member and as a contact member are disposed in tandem outside the loop formed by the intermediate transfer belt 10 along the surface of the intermediate transfer belt 10. The primary transfer rollers 14 and 15M, 15C, and 15Y (opposing members) are disposed inside the loop formed by the intermediate transfer belt 10, facing the photoconductive drums 5 and 6.

The drive roller 12 is rotated by a driving device, not illustrated, thereby rotating the intermediate transfer belt 10 in a direction indicated by an arrow A. The primary transfer roller 14 is supported swingably by an arm 16 (moving member). The primary transfer rollers 15Y, 15C, and 15M are supported swingably by arms 18Y, 18C, and 18M serving as moving members, respectively. One end of the arm 16 supports the primary transfer roller 14. The other end the arm 16 is rotatable about a shaft 16a. A pressing spring 17 disposed at the primary transfer roller side presses the primary transfer roller 14 against the photoconductive drum 5.

One end of the arms 18 supports the primary transfer rollers 15. The other end the arms 18 is rotatable about shafts 19Y, 19C, and 19M each disposed substantially at the center of the arms 18. Elastic members, such as pressing springs 51Y, 51C, and 51M, are disposed substantially at the other end of the arms 18 with a slot 20 and press the primary transfer rollers 15 against the photoconductive drums 6.

The photoconductive drum 5 is used for forming an image of the color black. The photoconductive drums 6Y, 6C, and 6M are used for forming an image of the colors yellow, cyan, and magenta, respectively. With a combination of the photoconductive drums 5 and 6, an image of a single color or an image of multiple colors is formed.

Although not illustrated, a charger, a developing device, a photoconductive drum cleaner, and so forth are disposed around each of the photoconductive drums 5 and 6 in the clockwise direction. In the image forming process, the chargers charge the surface of the photoconductive drums 5 and 6. The developing devices develop latent images formed on the photoconductive drums 5 and 6 with toner, thereby forming visible images, also known as toner images. Subsequently, the toner images on the photoconductive drums 5 and 6 are transferred onto the intermediate transfer belt 10 such that they are superimposed one atop the other, thereby forming a composite toner image. After the primary transfer process, residual toner remaining on the photoconductive drums 5 and 6 is cleaned by the photoconductive drum cleaner. Alternatively, the photoconductive drum cleaner may be eliminated. This is known as a cleanerless method, in which the developing device collects the residual toner. Still alternatively, a known cleaning method may be employed.

According to the illustrative embodiment, a bias is supplied to the primary transfer rollers 14 and 15 by a bias application device, not illustrated, thereby transferring electrostatically the toner images from the photoconductive drums onto the intermediate transfer belt 10.

According to the illustrative embodiment, the primary transfer method employs a roller-type primary transfer member, that is, the primary transfer rollers 14 and 15. Alternatively, a brush-type primary transfer member may be employed.

The secondary transfer roller 109 is disposed opposite the drive roller 12 via the intermediate transfer belt 10, thereby forming a secondary transfer nip therebetween. The transfer sheet P is transported to the secondary transfer nip between the intermediate transfer belt 10 and the secondary transfer roller 109. The transfer sheet P passes through the secondary transfer nip. The composite color toner image on the intermediate transfer belt 10 is transported to the secondary transfer nip between the intermediate transfer belt 10 and the secondary transfer roller 109. As the transfer sheet P passes through the secondary transfer nip, the composite toner image is transferred secondarily onto the transfer sheet P.

The drive roller 12 may be supplied with a bias same as the polarity of toner by the bias application device so that the composite toner image is electrostatically and secondarily transferred onto the transfer sheet (known as repulsive transfer). Alternatively, the secondary transfer roller 109 may be supplied with a bias opposite the polarity of the toner so that the composite toner image is electrostatically and secondarily transferred onto the transfer sheet (known as attractive transfer).

After the secondary transfer, the transfer sheet P passes through the fixing device 110 shown in FIG. 1 in which the toner image is fixed on the transfer sheet P, thereby forming an output image. Alternatively, heat is applied to the toner image on the transfer sheet P so that transfer and fixation of the toner image are performed at the same time.

Figure 3:
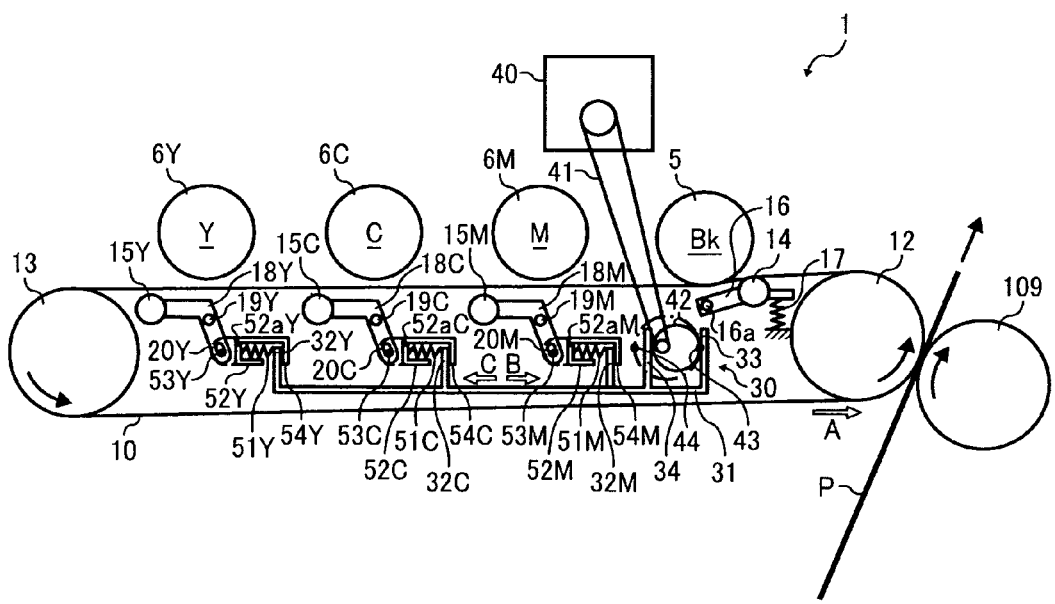
FIG. 3 is a schematic cross-sectional diagram illustrating the intermediate transfer belt unit in a state in which the intermediate transfer belt is separated from the photoconductive drums and the primary transfer rollers.

With reference to FIGS. 2 and 3, a description is provided of the belt unit, here, the intermediate transfer belt unit 1, according to the illustrative embodiment of the present invention. FIG. 3 is a schematic cross-sectional diagram illustrating the intermediate transfer belt unit 1 in a state in which the intermediate transfer belt 10 is separated from the photoconductive drums 5 and 6, and the primary transfer rollers 14 and 15.

It is to be noted that the suffixes Y, C, M, and Bk indicating colors are omitted unless otherwise specified.

In FIG. 2, the intermediate transfer belt 10 is in contact with the photoconductive drums 6 and the primary transfer rollers 15. By contrast, in FIG. 3, the photoconductive drums 6 and the primary transfer rollers 15 are separated from the intermediate transfer belt 10. As illustrated in FIGS. 2 and 3, in the intermediate transfer belt unit 1, the photoconductive drums 6 and the primary transfer rollers 15 can contact and separate from the intermediate transfer belt 10.

According to the illustrative embodiment, the intermediate transfer belt unit 1 includes the pressing springs 51Y, 51C, and 51M to press the arms 18Y, 18C, and 18M, respectively. Each of the arms 18 includes the slot 20 which is an action receiving portion at the rear end portion thereof. As illustrated in FIGS. 2 and 3, the intermediate transfer belt unit 1 includes a moving assembly 30. The moving assembly 30 enables the primary transfer rollers 15 to contact the intermediate transfer belt 10 when the arms 18 are pressed through the slots 20. The moving assembly 30 enables the primary transfer rollers 15 to separate form the intermediate transfer belt 10 when the arms 18 are released (not pressed).

The moving assembly 30 includes a slider 31 serving as an actuator, a driving device 40 serving as a drive source, an eccentric cam 42 serving as a drive mechanism, and the pressing springs 51Y, 51C, and 51M as an example of an elastic member. The slider 31 moves reciprocally between a first position shown in FIG. 2 and a second position shown in FIG. 3. When the moving assembly 30 moves to the first position, the rear end portion of the arms 18 is biased in the direction indicated by an arrow C (a contact direction). When the moving assembly 30 moves to the second position, the rear end portion of the arms 18 is biased in the direction indicated by an arrow B (a separation direction). The driving device 40 enables the slider 31 to move. The eccentric cam 42 converts the drive force (rotary force) of the driving device 40 into reciprocal movement. The pressing springs 51 transmit the moving force of the slider 31 to the rear end portion of the arms 18.

The slider 31 includes slider hook portions 32Y, 32C, and 32M, cam bearing surfaces 33 and 34, and spring bearing surfaces for the pressing springs 51. The slider hook portions 32Y, 32C, and 32M press the rear end portions of the arms 18 via the pressing springs 51. The cam bearing surfaces 33 and 34 are disposed facing each other via the eccentric cam 42 and contact a cam surface of the eccentric cam 42.

The driving device 40 is, for example, a drive motor. The drive force of the driving device 40 is transmitted to the eccentric cam 42 by a transmitter 41 including a gear, a pulley, and so forth. The eccentric cam 42 is rotated by the drive force of the driving device 40.

The pressing springs 51 are disposed at the rear end side of the arms 18 and held elastically in connectors 52Y, 52C, and 52M. One end of the pressing springs 51 at the arm side is supported by bearing surfaces 52aY, 52aC, and 52aM of the connectors 52. The other end of the pressing springs 51 is supported by a bearing surface of the slider hook portions 32 of the slider 31. One end of each of the connectors 52 includes a support pin 53 that fits into the hole 20. The other end of the connectors 52 includes a bearing surface 54 that contacts the slider hook portion 32 when the slider 31 is at the second position.

As illustrated in FIGS. 2 and 3, the connectors 52 and the slider 31 are disposed substantially near the arms 18. The connectors 52 and the slider 31 move in the same direction. That is, the connectors 52 and the pressing springs 51 in the connectors 52 move in the same direction as the direction of movement of the slider 31. In particular, in a sate in which the primary transfer roller 15 is separated from the intermediate transfer belt 10, an amount of movement of the connector 52 and the pressing spring 51 equals the amount of movement of the slider 31.

The support pin 53 of the connector 52 is rotatably supported by the hole 20 of the arm 18. The arm 18 is pressed by the pressing spring 51 disposed between the end surface (a spring bearing surface) of the slider hook portion 32 at the arm side and the connector 52. The bearing surface 54 of the connector 52 is disposed facing the pressing spring 51 via the slider hook portion 32 of the slider 31. In a state in which the primary transfer roller 15 contacts the intermediate transfer belt 10 as illustrated in FIG. 2, the bearing surface 54 of the connector 52 is separated from the slider hook portion 32.

The slider 31 includes the cam bearing surfaces 33 and 34 such that the eccentric cam 42 is disposed therebetween. Rotating the driving device 40 connected to the eccentric cam 42 through the transmitter 41 such as the gear and the pulley in one direction enables the slider 31 to move reciprocally in the directions indicated by arrows B and C.

Rotating the eccentric cam 42 from the state illustrated in FIG. 2 enables the slider 31 to move in the direction of arrow B while being pressed by the pressing spring 51. As the eccentric cam 42 is rotated further, the eccentric cam 42 contacts the cam bearing surface 33, moving the slider 31 in the direction of arrow B. The connector 52 moves in the direction of arrow B in conjunction with the slider 31, rotating the arm 18 about the support shaft 19. Accordingly, the primary transfer roller 15 moves away from the photoconductive drum 6, that is, the primary transfer roller 15 separates from the intermediate transfer belt 10.

As the top dead center 43 of the eccentric cam 42 comes to a position at which the top dead center 43 contacts the cam bearing surface 33 of the slider 31, rotation of the eccentric cam 42 is stopped. The intermediate transfer belt 10 and the photoconductive drum 6 are separated completely as illustrated in FIG. 3. By contrast, as the eccentric cam 42 is rotated in a state in which the intermediate transfer belt 10 and the photoconductive drum 6 are separated as illustrated in FIG. 3, the eccentric cam 42 contacts the cam bearing surface 34, thereby moving the slider 31 in the direction of arrow C.

The connector 52 also moves in the direction of arrow C, rotating the arm 18 and hence moving the primary transfer roller 15 to contact the intermediate transfer belt 10. Then, the primary transfer roller 15 stops. As the eccentric cam 42 is rotated further, the slider hook portion 32 separates from the bearing surface 54. As a result, the pressure of the pressing spring 51 acts on the slider 31 and the arm 18 such that the slider 31 pushes back the eccentric cam 42, and the arm 18 moves the primary transfer roller 5 towards the photoconductive drum 6. As the top dead center 43 of the eccentric cam 42 comes to a position at which the top dead center 43 contacts the cam bearing surface 34 of the slider 31, rotation of the eccentric cam 42 is stopped. Accordingly, the intermediate transfer belt 10 and the photoconductive drum 6 contact each other as illustrated in FIG. 2.

According to the illustrative embodiment, as is understood from FIGS. 2 and 3, a perpendicular line from the center of rotation of the photoconductive drum 6 to the surface of the intermediate transfer belt 10 wound around the drive roller 12 and the driven roller 13 does not overlap with a perpendicular line from the center of the primary transfer roller 15 to the surface of the intermediate transfer belt 10. The primary transfer roller 15 pushes up the intermediate transfer belt 10 such that the intermediate transfer belt 10 is wound around a portion of the photoconductive drum 6. In other words, the position of the primary transfer roller 15 is shifted relative to the photoconductive drum 6 in the direction of movement of the intermediate transfer belt 10. Accordingly, the primary transfer roller 15 pushes up the intermediate transfer belt 10 so that the intermediate transfer belt 10 is wound around a portion of the photoconductive drum 6.

The position of the primary transfer roller 15 relative to the photoconductive drum 6 when contacting the photoconductive drum 6 is fixed, and the primary transfer roller 15 is not biased against the photoconductive drum 6. In this configuration, such as an offset transfer method, the primary transfer roller 15 tends to move by a large amount when contacting or separating from the photoconductive drum 6, hence necessitating a large eccentric amount of the eccentric cam 42. The large eccentric amount of the eccentric cam 42 increases frictional force between the eccentric cam 42 and the slider 31. As a result, the rotational torque of the cam shaft is likely large.

In view of the above, according to the illustrative embodiment, the rotational torque of the cam shaft can be reduced in the belt unit having the moving mechanism of the present invention. In particular, it is advantageous to employ the present invention in the belt unit using the offset transfer method.

Figure 4:
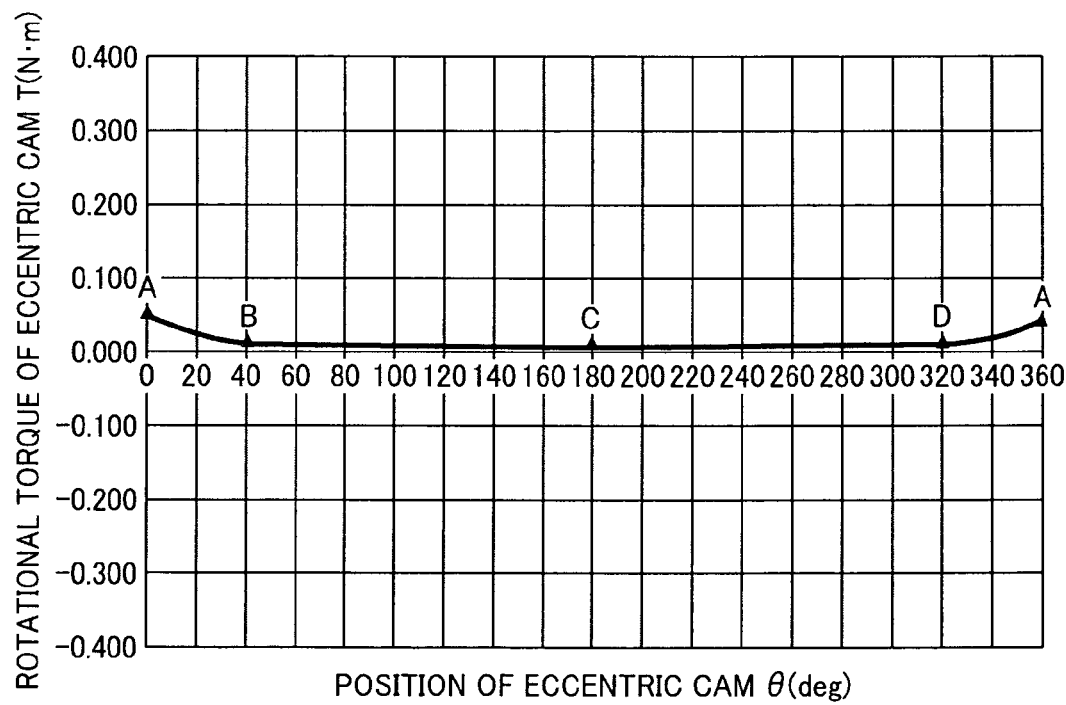
FIG. 4 is a torque curve showing rotational torque of a cam shaft of an eccentric cam employed in the intermediate transfer belt unit as the primary transfer rollers contact and separate from the intermediate transfer belt.
Figure 5A:
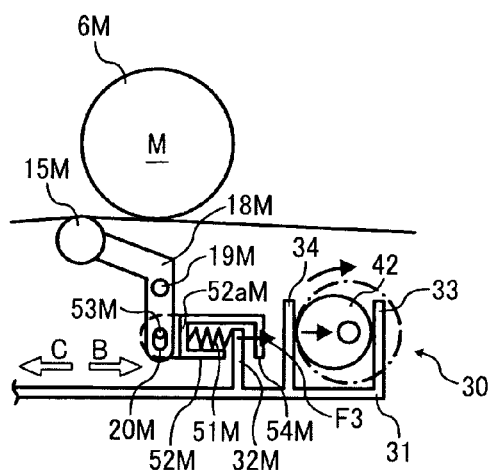
FIGS. 5A through 5D are partially enlarged schematic diagrams illustrating a relation between an amount of rotation of the eccentric cam and positions of devices in the intermediate transfer belt unit in relation to point A through point D shown in FIG. 4.
Figure 5B:
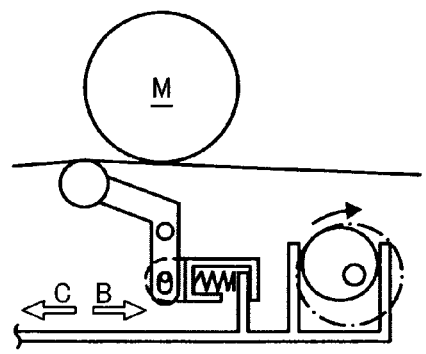
Figure 5C:
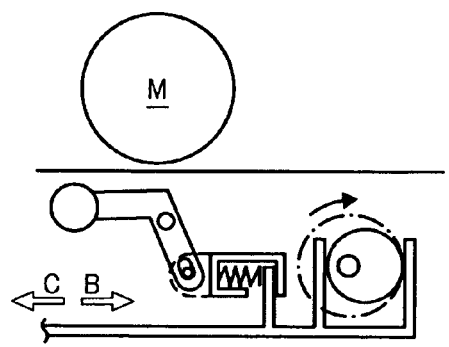
Figure 5D:
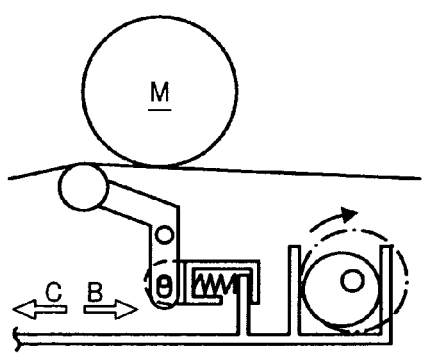

With reference to FIGS. 4 and 5, a description is provided of rotational torque of the cam shaft of the eccentric cam. FIG. 4 is a torque curve showing the rotational torque of the cam shaft of the eccentric cam 42 when the primary transfer rollers 15 contact/separate from the intermediate transfer belt 10. FIGS. 5A through 5D are partially enlarged schematic diagrams illustrating a relation between an amount of rotation of the eccentric cam 42 and positions of devices in the intermediate transfer belt unit 1 in relation to point A through point D of FIG. 4. In FIGS. 5B through 5D, the suffix M indicating the color is omitted.

From point A to point B in FIG. 4, a pressing force F3 of the pressing spring 51 in addition to the rotational torque of the eccentric cam 42 acts on the eccentric cam 42 so that engagement of the gear and the pulley of the transmitter 41 is unstable as in the related art. However, an amount of compression of the pressing spring 51 is significantly small, when compared with the related art, thereby reducing significantly the shock noise.

At point B, the slider hook portion 32 and the bearing surface 54 contact each other, and the pressing spring 51 is stretched between the bearing surface 52a and the bearing surface 54, with the slider hook portion 32 therebetween. As a result, the pressing force F3 against the slider 31 and the arm 18 becomes zero. From point B to point C, in addition to the load torque of the driving system such as the driving device 40 and the transmitter 41, the weight of the slider 31 and each part connecting to from the slider 31 to the primary transfer roller 15, and resultant force of the load torque due to friction act on the eccentric cam 42 so that the force in the direction of acceleration of the eccentric cam 42 acts on the eccentric cam 42. However, the pressing force is significantly smaller than the pressing force from point A to point B. Hence, the shock noise can be small.

On the contrary to point B to point C, from point C to point D, the load torque opposite the direction of rotation of the eccentric cam 42 acts on the eccentric cam 42. From point D to point A in a state in which the primary transfer roller 15 contacts the intermediate transfer belt 10, in addition to the load torque opposite the direction of rotation of the eccentric cam 42, the pressing spring 51 presses the slider 31. As compared with the related art, the amount of movement of the slider 31 pressing the arm 18 is significantly small, thereby reducing the driving torque and hence the size of the driving device 40 and the transmitter 41.

The slider hook portion 32 of the slider 31 serves as the bearing surface for the pressing spring 51 and the hook for rotating the arm 18. In this configuration, the moving mechanism 30 can be made compact. According to the illustrative embodiment, the slider hook portion 32, the slider 31, and the pressing spring 51 move together during the contact/separation operation of the primary transfer roller 15. Accordingly, compression of the pressing spring 51 accompanied by the movement of the slider 31 occurs only when the primary transfer roller 15 contacts the intermediate transfer belt 10, thereby reducing fluctuation of the load torque relative to the cam shaft of the eccentric cam 42. With this configuration, the rotational torque required for the driving device 40 and the shock noise when the primary transfer roller 15 contacts or separates from the intermediate transfer belt 10 are reduced, if not prevented entirely.

Furthermore, the moving mechanism 30 can be made compact by having the slider hook portion 32 to serve as both the bearing surface for the pressing spring 51 and the hook portion for rotating the arm 18. The cost can be also reduced.

According to the illustrative embodiment, the pressing spring 51 does not press directly the arm 18, but presses the arm 18 via the connector 52. In a case in which the arm 18 is pressed directly by the pressing spring 51, a spring bearing surface needs to be provided to the rear end of the arm 18. Generally, the spring bearing surface has a flat surface. If the spring bearing surface provided to the arm 18 is tilted due to rotation of the arm 18, the pressing spring 51 buckles. Thus, some extra space is needed to allow buckling of the pressing spring 51.

In view of the above, according to the illustrative embodiment, the pressing spring 51 presses the arm 18 via the connector 52 so that the pressing spring 51 is prevented from buckling, hence reducing the size of the moving mechanism 30.

According to the illustrative embodiment, the support pin 53 of the connector 52 is fitted into the hole 20 of the arm 18. With this configuration, force is transmitted from the connector 52 to the arm 18 in both cases in which the primary transfer roller 15 contacts the intermediate transfer belt 10 and it separates from the intermediate transfer belt 10.

If the arm 18 and the connector 52 are not connected, when moving the primary transfer roller 15 towards the intermediate transfer belt 10, force from the connector 52 acts on the arm 18. On the other hand, when separating the primary transfer roller 15 from the intermediate transfer belt 10, no force from the connector 52 acts on the arm 18. As a result, when the primary transfer roller 15 is separated from the intermediate transfer belt 10, the arm 18 separates from the connector 52. When the primary transfer roller 15 contacts the intermediate transfer belt 10, the arm 18 contacts the connector 52, producing the shock noise undesirably. Due to the shock noise, the product value is degraded.

In view of the above, according to the illustrative embodiment, connecting the arm 18 and the connector 52 prevents undesirable shock noise upon moving the primary transfer roller 15. Hence, the product value is enhanced. Furthermore, because the hole 20 is a slot, the connector 52 does not move vertically when the rear end portion of the arm 18 moves in the shape of arc of a circle about the support shaft 19. Accordingly, the primary transfer roller 15 is moved reliably.

Still further, the slider 31 includes the cam bearing surface 33 disposed opposite the cam surface 34 via the eccentric cam 42. Without the cam bearing surface 33, that is, having the cam surface 34 only, the drive force from the eccentric cam 42 acts only in the direction of arrow C. In this case, when the primary transfer roller 15 is separated from the intermediate transfer belt 10, the eccentric cam 42 and the cam surface 34 are separated. As the drive force of the eccentric cam 42 acts on the cam bearing surface 34 again, the eccentric cam 42 strikes the cam bearing surface 34, producing shock noise.

By contrast, without the cam bearing surface 34, that is, having only the cam surface 33, a biasing force enabling the primary transfer roller 15 to contact the intermediate transfer belt 10 is necessitated. However, when separating the primary transfer roller 15 from the intermediate transfer belt 10, the primary transfer roller 15 needs to move against the biasing force, requiring greater rotational torque of the eccentric cam 42. To address this difficulty, the slider 31 includes two cam bearing surfaces 33 and 34.

According to the illustrative embodiment, the intermediate transfer belt 10 contacts and separates from the photoconductive drum 6 by moving the primary transfer roller 15. Alternatively, the photoconductive drum 6 may move to contact and separate from the intermediate transfer belt 10.

Figure 6:
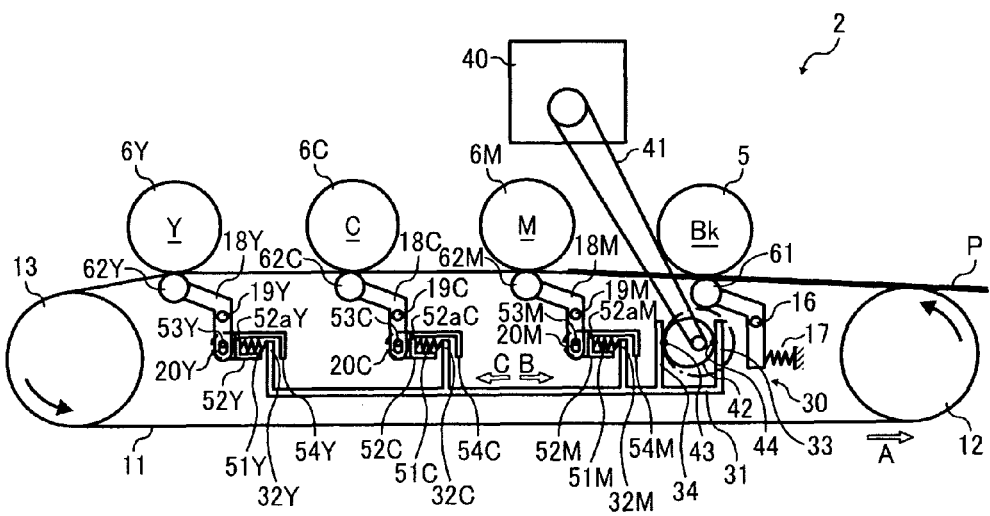
FIG. 6 is a schematic cross-sectional diagram illustrating a belt unit for transporting a transfer sheet such as a recording medium, employed in an image forming apparatus, according to another illustrative embodiment of the present invention.

With reference to FIG. 6, a description is provided of a belt unit according to another illustrative embodiment of the present invention.

FIG. 6 is a schematic cross-sectional diagram illustrating a belt unit for transporting a transfer sheet or a recording medium and an image forming apparatus employing the belt unit. According to the present embodiment, the intermediate transfer belt unit 1 is employed as a belt unit for transporting a transfer sheet. It is to be noted that the same reference numerals used in the foregoing embodiments are provided to the similar or the same constituent elements in FIG. 6 when discrimination therebetween is not required. The suffixes Y, C, M, and Bk indicating colors are omitted unless otherwise specified.

According to the foregoing embodiment, a description is provided of the belt unit employed in the tandem-type image forming apparatus using the intermediate transfer method. Alternatively, the belt unit may be employed in the tandem-type image forming apparatus using a direct-transfer method. Here, in the image forming apparatus using a direct-transfer method a toner image formed on a photoconductive drum is transferred directly to a transfer sheet or a recording medium.

In FIG. 6, a belt unit 2 for transporting the transfer sheet or the recording medium includes a transfer sheet conveyance belt 11 (a belt member) formed into a loop and wound around and stretched between the drive roller 12 and the driven roller 13. The photoconductive drums 5, 6M, 6C, and 6Y (contact members) are disposed in tandem outside the loop formed by the transfer sheet conveyance belt 11 along the surface thereof. Transfer rollers 61, 62M, 62C, and 62Y (opposing members) are disposed inside the loop formed by the transfer sheet conveyance belt 11, facing the photoconductive drums 5, 6M, 6C, and 6Y, respectively.

The transfer sheet P is transported on the transfer sheet conveyance belt 11 while being sandwiched between the photoconductive drums 5, 6M, 6C, and 6Y, and the transfer sheet conveyance belt 11, thereby transferring the toner images borne on the photoconductive drums 5, 6M, 6C, and 6Y onto the transfer sheet P. In FIG. 6, the center of rotation of the transfer rollers 61 and 62 is immediately below the center of rotation of the photoconductive drums 5 and 6. In other words, a perpendicular line from the center of rotation of the photoconductive drums 5 and 6 to the transfer sheet conveyance belt 11 wound around the drive roller 12 and the driven roller 13 is aligned with the center of rotation of the transfer rollers 61 and 62.

Alternatively, similar to the foregoing embodiment, the image forming apparatus may employ the offset-transfer method in which the transfer rollers 61 and 62 are disposed such that the transfer sheet conveyance belt 11 is wound around a portion of the photoconductive drums 5 and 6.

According to the present embodiment, the transfer sheet conveyance belt 11 contacts or separates from the photoconductive drum 6. Alternatively, the photoconductive drum 6 may move to contact and separate from the transfer sheet conveyance belt 11. In such a configuration, the same effect as that of the foregoing embodiment can be achieved.

According to the illustrative embodiment, the present invention is employed in the image forming apparatus. The image forming apparatus includes, but is not limited to, a copier, a printer, a facsimile machine, and a multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A belt unit, comprising:
    an endless rotatable belt wound around a plurality of rollers and formed into a loop;
    a contact member disposed along a surface of the belt;
    an opposing member disposed facing the contact member via the belt;
    a moving member to swing and movably support the opposing member to contact and separate from the belt, the moving member including an action receiving portion; and
    a moving assembly to bias the action receiving portion of the moving member in a first direction in which the opposing member contacts the belt and in a second direction opposite the first direction in which the opposing member separates from the belt,
    the moving assembly including:
        an actuator to bias the action receiving portion of the moving member in the first and the second directions;
        a drive mechanism to move the actuator in the first and the second directions;
        an elastic member to transmit a moving force of the actuator to the action receiving portion when the actuator moves; and
        a connector to hold elastically the elastic member and connect the moving member to the actuator, the connector including an action sending portion,
        wherein the action receiving portion and the action sending portion include a slot and a pin movably supported by the slot, wherein the moving force is transmitted from the actuator to the action receiving portion via the elastic member; and wherein the action receiving portion of the moving member includes the slot to movably support the connector and the actuator.

2. The belt unit according to claim 1, wherein the elastic member moves in the same directions as the directions of movement of the actuator.

3. The belt unit according to claim 1, wherein the drive mechanism is an eccentric cam.

4. A transfer belt unit employed in an image forming apparatus, comprising the belt unit of claim 1, wherein the contact member is an image bearing member to bear a toner image on a surface thereof, and the opposing member is a transfer member to transfer the toner image.

5. The transfer belt unit according to claim 4, wherein the belt is an intermediate transfer belt onto which the toner image is transferred from the image bearing member.

6. The transfer belt unit according to claim 4, wherein the belt transports a transfer sheet.

7. An image forming apparatus, comprising the transfer belt unit of claim 4.

8. A belt unit for an image forming apparatus, comprising:
an endless rotatable belt wound around a plurality of support rollers and formed into a loop;
a photoconductive drum disposed along a surface of the belt;
a roller disposed facing the photoconductive drums via the belt;
an arm to swing and movably support the roller to contact and separate from the belt, the arm including a portion with a hole; and
a moving assembly to bias the portion with the hole of the arm in a first direction in which the roller contacts the belt and in a second direction opposite the first direction in which the roller separates from the belt,
the moving assembly including:
a slider to bias the portion of the arm with the hole in the first and the second directions;
an eccentric cam to move the slider in the first and the second directions; and
a spring to transmit a moving force generated by the slider to the portion of the arm with the hole as the slider moves; and
a connector to hold elastically the spring and connect the arm to the slider,
wherein one end of the spring is supported by the connector and the other end of the spring is supported by the slider,
wherein the moving force is transmitted from the slider to the portion of the arm via the spring, and
wherein the arm includes a slot to movable support the connector and the slider.

9. A belt unit, comprising:
an endless rotatable belt wound around a plurality of rollers and formed into a loop;
a contact member disposed along a surface of the belt;
an opposing member disposed facing the contact member via the belt;
a moving member to swing and movably support the opposing member to contact and separate from the belt, the moving member including an action receiving portion; and a moving assembly to bias the action receiving portion of the moving member in a first direction in which the opposing member contacts the belt and in a second direction opposite the first direction in which the opposing member separates from the belt, the moving assembly including:
an actuator to bias the action receiving portion of the moving member in the first and the second directions;
a drive mechanism to move the actuator in the first and the second directions;
an elastic member to transmit a moving force of the actuator to the action receiving portion when the actuator moves; and
a connector to hold elastically the elastic member and connect the moving member to the actuator,
wherein one end of the elastic member is supported by the connector and the other end of the elastic member is supported by the actuator, and
wherein the moving force is transmitted from the actuator to the action receiving portion via the elastic member, and
wherein the action receiving portion of the moving member includes a slot to movably support the connector and the actuator.

10. A belt unit, comprising:
an endless rotatable belt wound around a plurality of rollers and formed into a loop;
a contact member disposed along a surface of the belt;
an opposing member disposed facing the contact member via the belt;
a moving member to swing and movably support the opposing member to contact and separate from the belt, the moving member including an action receiving portion; and
a moving assembly to bias the action receiving portion of the moving member in a first direction in which the opposing member contacts the belt and in a second direction opposite the first direction in which the opposing member separates from the belt, the moving assembly comprising:
an actuator to bias the action receiving portion of the moving member in the first and the second directions;
a drive mechanism to move the actuator in the first and the second directions;
an elastic member to transmit a moving force of the actuator to the action receiving portion when the actuator moves; and
a connector to hold elastically the elastic member and connect the moving member to the actuator, the connector including a bearing surface configured to contact the actuator,
wherein the bearing surface separates from the actuator when the opposing member is in a first position where the opposing member contacts the belt, and the bearing surface contacts the actuator when the opposing member is in a second position where the opposing member separates from the belt.

11. The belt unit according to claim 1, wherein the pin moves relative to the slot when the opposing member moves from a first position where the opposing member contacts the belt to a second position where the opposing member separates from the belt.

12. The belt unit according to claim 10, wherein the bearing surface contacts the actuator when the opposing member moves.

13. The belt unit according to claim 10, wherein the elastic member is stretched between the connector and the actuator when the opposing member moves.

14. The belt unit according to claim 1, wherein the connector and the actuator move in a same direction.

15. The belt unit according to claim 1, wherein an amount of movement of the connector and the elastic member equals an amount of movement of the actuator.

16. The belt unit according to claim 1, wherein the elastic member is disposed at a rear end side of the moving member and held elastically in the connector.

17. The belt unit according to claim 1, wherein one end of the elastic member at an arm side is supported by a bearing surface of the connector, and the other end of the elastic member is supported a bearing surface of the actuator.

18. The belt unit according to claim 1, wherein the drive mechanism is disposed within the actuator.

19. The belt unit according to claim 18, wherein the actuator includes cam bearing surfaces such that the drive mechanism is disposed therebetween.

20. The belt unit according to claim 1, wherein the opposing member comes into contact with an inner surface of the belt.

21. The belt unit according to claim 8, wherein the roller comes into contact with an inner surface of the belt.

22. The belt unit according to claim 9, wherein the opposing member comes into contact with an inner surface of the belt.

23. The belt unit according to claim 10, wherein the opposing member comes into contact with an inner surface of the belt.

* * * * *